Aug. 9, 1938.                  C. D. FATOR                    2,125,903
        CONTROL UNIT FOR PROJECTOR AND SOUND REPRODUCING INSTALLATIONS
                        Filed March 11, 1937        3 Sheets-Sheet 1
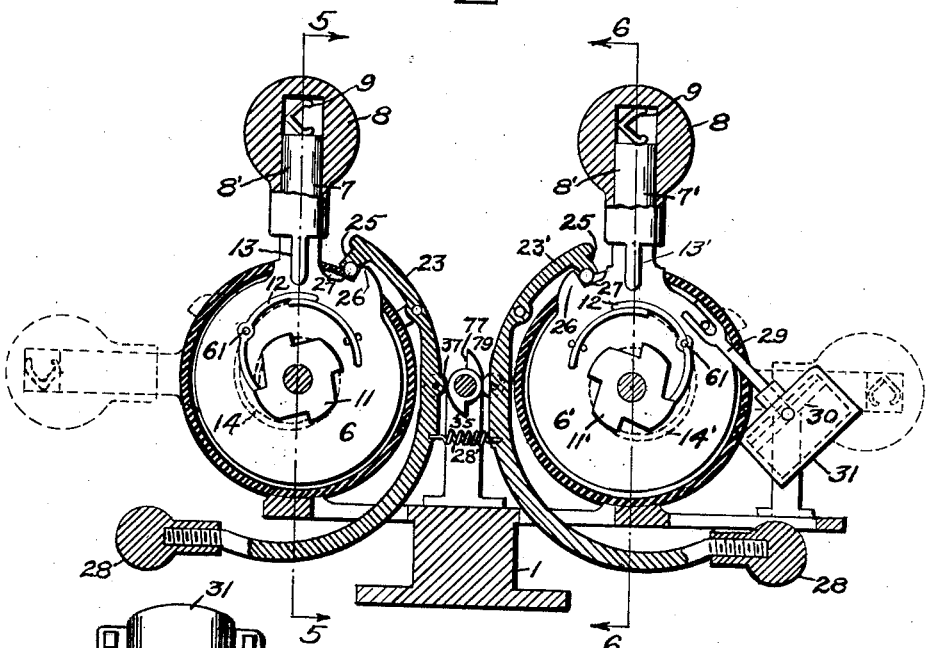
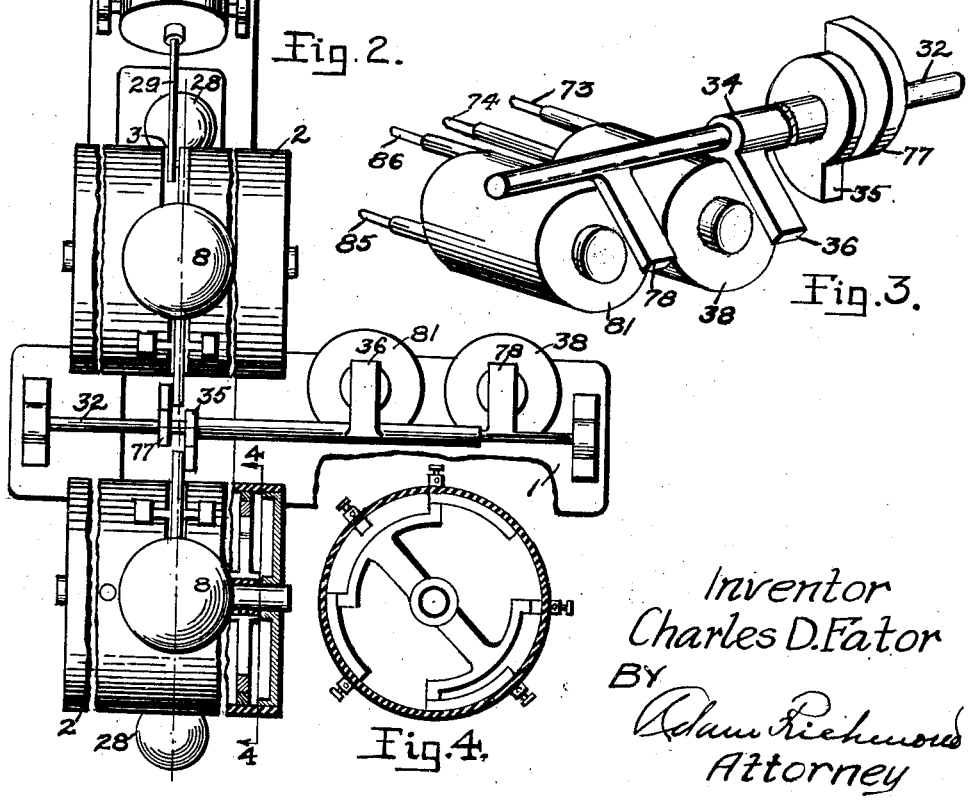
Inventor
Charles D. Fator
BY
Attorney Aug. 9, 1938.  C. D. FATOR  2,125,903
CONTROL UNIT FOR PROJECTOR AND SOUND REPRODUCING INSTALLATIONS
Filed March 11, 1937   3 Sheets-Sheet 2

Inventor
Charles D. Fator,
By Adam Richmond
Attorney

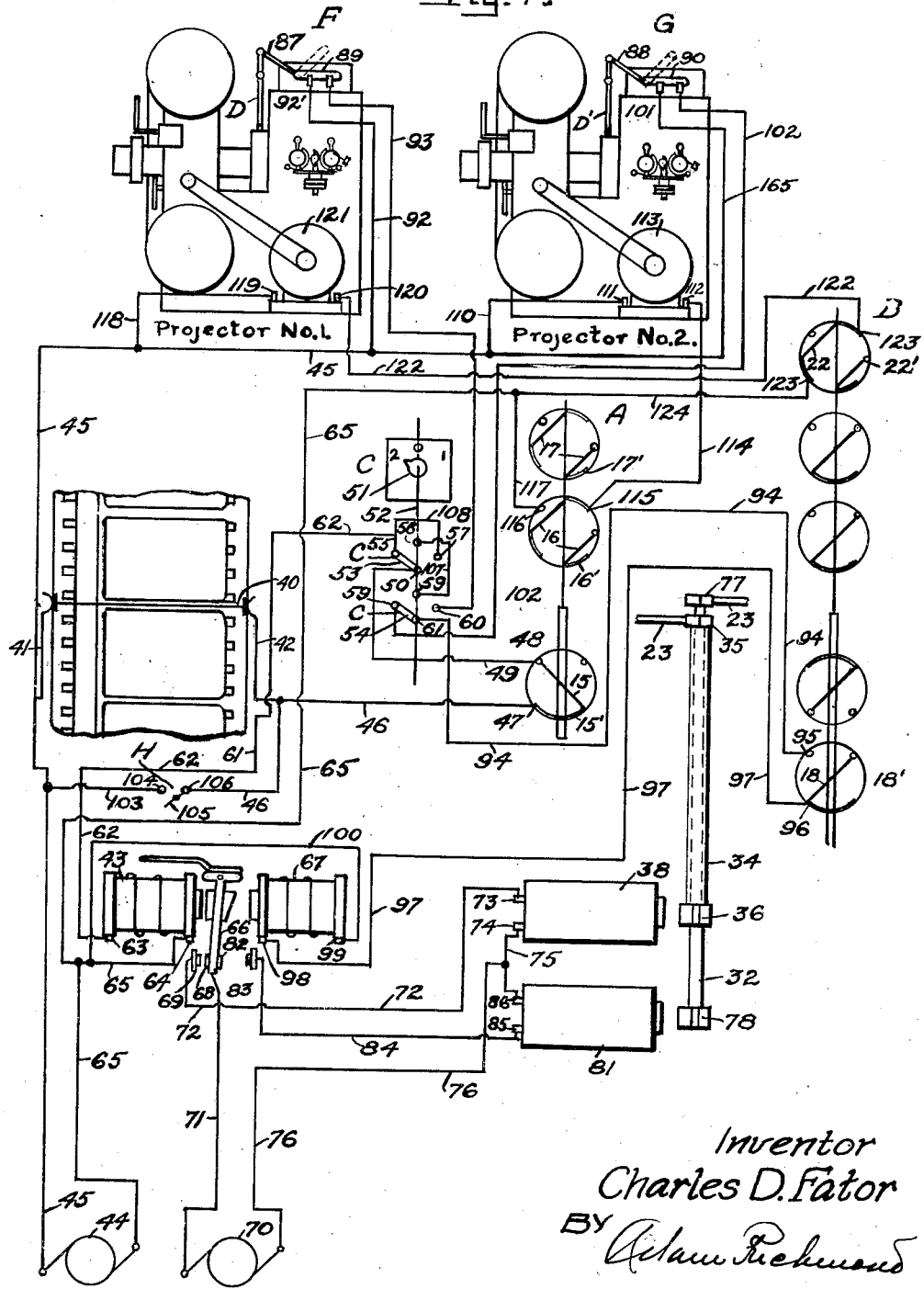

Patented Aug. 9, 1938

2,125,903

UNITED STATES PATENT OFFICE 2,125,903

CONTROL UNIT FOR PROJECTOR AND SOUND REPRODUCING INSTALLATIONS

Charles D. Fator, San Antonio, Tex.

Application March 11, 1937, Serial No. 130,316

13 Claims. (Cl. 88—17)

(Granted under the act of March 3, 1883, as amended April 30, 1928; 370 O. G. 757)

This invention described herein may be manufactured and used by or for the Government for governmental purposes, without the payment to me of any royalty thereon.

This invention generically relates to automatic projector systems, but more especially it is directed to a semi-automatic control-unit adapted to be attached to each projector and to be operated either manually or electro-mechanically to disrupt certain circuits and complete others when a change-over is effected from one projector to another.

One object of this invention is to provide a control-unit for automatic projector systems wherein two groups of rotary contacts are adapted to be successively released from a predetermined position and with a suitable time interval between releasements, one group being electro-mechanically released at the approach of the film-end on the finishing projector, the other group being similarly released when the projector going into operation, has attained projection speed.

Another object of this invention is to provide a control-unit in which there are two groups of rotary contacts, the contacts of each group being rotatable as a unit and in a clock and anti-clockwise direction through an angle of 90°, each group having a "cocked" position in which it is held by a trigger mechanism and an "uncocked" position to which it is adapted to be moved under the action of a spring, after the trigger mechanism has been released either manually or automatically.

Another object of this invention is to provide a control-unit in which there are two groups of switches, each group being simultaneously operable by a single control lever, moving through an angle of 90° from a "cocked" to an "uncocked" position, the control levers of the respective groups being held in "cocked" position by trigger mechanisms, one of the trigger mechanisms being electro-mechanically released by means of a "cue" on the film of the finishing projector, the other mechanism being released by an automatically controlled switch device on the projector going into use, said device becoming effective as the substitute projector attains projection speed.

Another object of this invention is to provide a control-unit for projection systems wherein there are two groups of rotary contacts, the contacts of one group being "quick acting" and adapted to control the "cue" circuits of the finishing projector, and the motor circuit of the projector going into service, the contacts of the other group being "slow acting" and adapted to control the motor circuit of the finishing projector, the circuits of its arc, sound reproducing means and douser, as well as the circuits of the arc, sound reproducing means and douser of the machine going into use.

With these and other objects in view this invention consists in certain novel details of construction, combination and arrangement of parts to be more fully hereinafter described and set forth in the accompanying claims.

Briefly stated, this invention comprises a control-unit including juxta-positioned housings in each of which is mounted a shaft carrying a plurality of rotary switch contacts, the contacts on each shaft being simultaneously operable by a control lever adapted to have a "cocked" and an "uncocked" position, the respective levers being held in their "cocked" position by cam-operated trigger mechanisms which retain the levers against the action of springs tending to force them to their "uncocked" positions, a pair of relays adapted to actuate the cams coacting with the respective trigger mechanisms, a "cue" contact positioned near the end of the film of the finishing machine and controlling the circuits of one of the cam actuating relays and a circuit-closing device governed by the fire-shutter of the machine going into service, and controlling the circuit of the remaining cam actuating relay, whereby the "cue" on the film will function to release one of said trigger mechanisms and the circuit-controlling device governed by the fire-shutter will serve to release the other for the purpose of forming and disrupting the various circuits involved in a shift from one projector and its sound reproducing means to another.

Referring more particularly to the accompanying drawings in which corresponding parts are indicated by similar reference characters:

Fig. 1 is a transverse vertical section of the control unit and a part of its semi-automatic "cue" and fire-shutter controlled electro-mechanical trip mechanisms, the two operating levers of the control unit being shown in full line in their "cocked" positions and one of the two levers being shown in dotted outline in its "uncocked" position;

Fig. 2 is a top plan view of the control-unit and a part of its semi-automatic "cue" and fire-shutter controlled electro-mechanical trip mechanism;

Fig. 3 is a fragmentary detail in perspective of the armature and cam shafts of the semi-automatic "cue" and fire shutter controlled electro-mechanical trip mechanism;

Fig. 4 is a transverse vertical section taken on the line 4—4 of Fig. 2;

Figure 6:
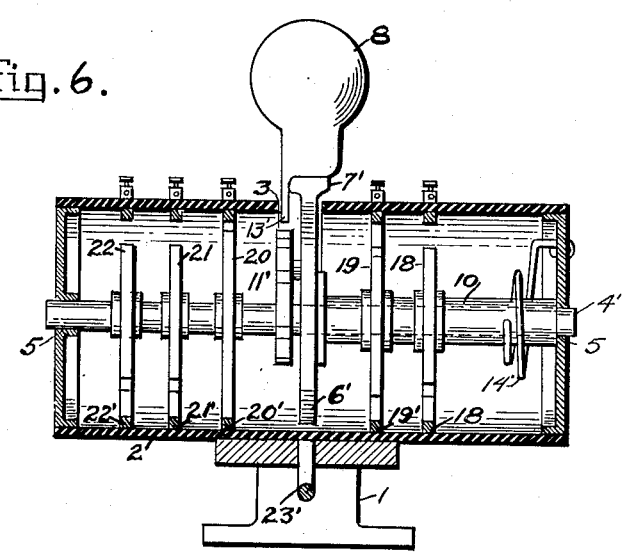

Fig. 6 is a transverse vertical section taken on the line 6—6 of Fig. 1, looking in the direction of the arrows; and Fig. 7 is a diagrammatic view illustrating two projectors, one a finishing, the other a projector about to go into service, the control-unit mounted on the finishing projector and including its two groups of three and four-way rotary switches, the latter being shown in "cocked" position, a fragment of the film on the finishing projector and a metallized "cue" on the film edges, the contacts coacting with the "cues", the electro-mechanical mechanism for releasing one group of switches, the circuits for said mechanism including the "cue" contacts, the automatic-fire-shutter controlled switches on the two projectors, the electro-mechanical trip mechanism for the remaining group of switches, the circuits for said mechanism including the fire-shutter control switches, a manually operable selector switch, and certain circuits which are adapted to be opened and closed when the two groups of switches have been rotated to "uncocked" position.

In projector and sound reproducing installations involving two or more projectors, and their sound reproducing means and wherein the change-over from one projector to another is automatically effected, it has been the practice to control the circuits of the various instrumentalities involved in the change-over by means of remote controlled relays situated at various points in the installation. This arrangement has proved to be unsatisfactory in that the remote controlled relays increased the cost of the installation and provided sources of trouble at widely scattered points. It is therefore the aim and purpose of the instant invention to eliminate these relays and to provide each projector with a control-unit having two groups of electro-mechanically released spring actuated rotary contacts which are adapted to perform all of the functions heretofore allocated to the remote control relays and which in the event of trouble are located at one place for inspection.

For the sake of convenience, the various components of this invention, namely control unit, cue-controlled electro-mechanical trip mechanism, fire-shutter-controlled electro-mechanical trip mechanism and operation, will be considered in the order mentioned. Likewise, to facilitate discussion of this invention the two groups of rotary contacts, one of which is "quick-acting", the other "slow-acting", will be referred to as "instantaneous" and "delayed-action" contacts.

*Control unit.*—This construction comprises a mounting 1, formed to support cylindrical casings 2 and 2', which are centrally slotted as at 3, for a purpose hereinafter to appear. Within each casing is a group of three and four-way switches A and B of the rotary type hereinafter to be referred to as "instantaneous" and "delayed action" switches respectively.

Figure 5:
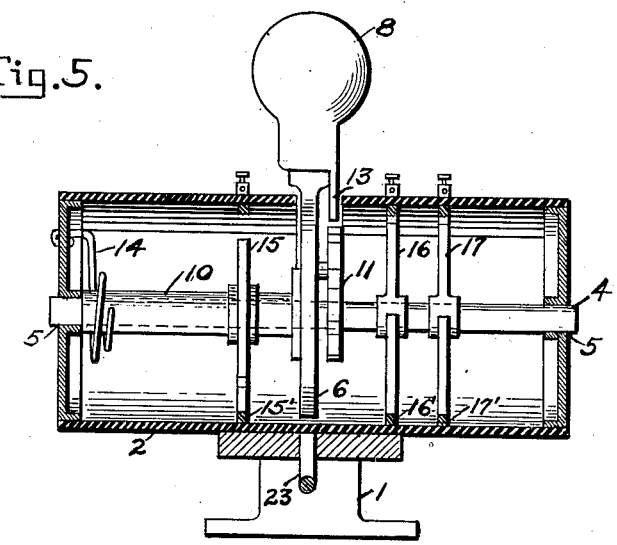
Fig. 5 is a transverse vertical section taken on the line 5—5 of Fig. 1, looking in the direction of the arrows.

Extending centrally through the respective casings 2 and 2' are shafts 4 and 4' which are journalled at their extremities in the ends of the casings as at 5, as clearly shown in Figs. 5 and 6 of the drawings. Rotatably mounted on the respective shafts 4 and 4' midway between their ends are discs 6 and 6'. These discs are formed with operating levers 7 and 7' which extend through and operate in the slots 3 of the casings. The free ends of levers 7 are fitted with operating knobs 8, recessed as at 8' to permit telescopic engagement with the levers 7 and 7'. Springs 9 within the knobs, normally space the upper ends of the levers from those of the recesses 8' in the knobs, so as to permit depression of the knobs against the action of the spring, for a purpose hereinafter to appear.

Connected to the discs 6 and 6' in the respective casings and extending from one face of each of said discs to the ends of the casings, are sleeves 10 and 10'. Adjacent the opposite faces of the discs 6 and 6' and keyed to shafts 4 and 4' are ratchets 11 and 11'. These ratchets are normally engaged by dogs 12 and 12' pivoted to the discs 6 and 6' as clearly shown in Fig. 1 of the drawings. The free ends of dogs 12 and 12' are adapted to be engaged by fingers 13 and 13' depending from the operating knobs 8 so that depression of the knobs disengages dogs and ratchets and permits independent rotation of the discs with respect to the shafts.

Springs 14 and 14' connected at one of their ends to sleeves 10 and 10' and at their opposite extremities to the ends of the casings, serve to urge the discs 6 and 6' and their operating levers from the full line or "cocked" position shown in Fig. 1, to the dotted line or "uncocked" position shown in the same figure. Keyed to sleeve 10 and shaft 4 in casing 2 of the control-unit are rotary contact members 15, 16 and 17 adapted to coact with complemental stationary contact members 15', 16' and 17' arranged around the inner surface of the casings. The rotary contacts 15, 16 and 17 and their complementary stationary contacts constituting a three-way and two four-way rotary switches, as shown in Fig. 7 of the drawings.

Keyed to sleeve 10' and shaft 4' in casing 2 of the control-unit are rotary contact members 18, 19, 20, 21 and 22, which are adapted to coact with the stationary contact members 18', 19', 20', 21' and 22', on the inner surface of the casing. Rotary contact members 18, 19, 20, 21 and 22 and their complemental stationary contact members constitute four three-way switches, and one four-way switch, as clearly shown in Fig. 7 of the drawings.

To hold the operating levers 7 and 7' in their cocked position, a pair of triggers 23 and 23' are disposed between casings 2 and 2' mid-way of their ends and are pivotally attached to the casings as at 24. Triggers 23 and 23' are provided at their upper ends with depending lips 25 adapted to engage the camming shoulders 26 formed on the peripheries of discs 6 and 6' as clearly shown in Fig. 1 of the drawings. Lips 25 are provided with anti-friction rollers 27 to facilitate the movement of the lips over the shoulders 26 and into positions to their rear. The lower ends of triggers 23 and 23' are fitted with knobs 28 to afford finger tip control of the triggers when such control becomes necessary. A spring 28' interconnects the triggers 23 and 23' and serves to maintain the engagement of the lips 25 with shoulders 26, as will be understood without further discussion.

As the rotary contact members of the delayed action switch group in casing 2' are intended to move more slowly than those of the instantaneous group of switches in casing 2, the disc 6' in casing 2' is connected to the upper end of an arm 29, the lower end of which is attached to the piston 30 of a dash pot 31, as shown in Fig. 1 of the drawings.

According to the preceding arrangement when the operating levers 7 and 7' are rotated through an angle of 90° from the position shown in dotted outline in Fig. 1, to the position shown in full lines, the lips 25 of triggers 23 and 23' will engage the camming shoulders 27 on discs 6 and 6' to hold said levers in cocked position against the action of springs 14 and 14' which tend to urge them to their "uncocked" position shown in dotted outline. When the levers 7 and 7' have been moved to "cocked" position, the rotary contact members keyed to sleeves 10 and 10' will rotate with the discs while the rotary contact members keyed to shafts 4 and 4' remain stationary, but when triggers 23 and 23' and camming shoulders 26 have been disengaged and the levers 7 and 7' returned to "uncocked" position, that is to say, have moved from the full line position to dotted outline position Fig. 1, then all of the rotary contact members will be rotated to complete the electrical functions assigned to them, during the return movement of the levers.

*Cue-controlled electro-mechanical trip mechanism.*—To automatically actuate trigger 23 when a predetermined point has been reached near the finishing end of the film, termed the "cue", there is provided an electro-magnetic trip comprising a shaft 32, rotatably mounted between casings 2 and 2' in bearings 33. Shaft 32 is encased by a sleeve 34 having a cam 35 at one end and an armature 36 adjacent its opposite end. Cam 35 is adapted to coact with a friction roller 37 journalled in trigger 23, so that as the cam is operated by sleeve 34, trigger 23 will be depressed and its lip 25 disengaged from shoulder 26, thus freeing lever 7 and allowing it to return to its "uncocked" position. To revolve sleeve 34 its armature 36 is disposed in operative relation with respect to a relay 38.

In order to energize relay 38 at a predetermined point in the length of the film, the edges of the latter near its finishing end are metallized at diametrically opposite points to form electrical contacts 39 and 39', which are interconnected by conductor 40, the latter extending across the film (Fig. 7). Contacts 39 and 39' are adapted to coact with suitably mounted resilient contact fingers 41 and 42 which are included in the circuit of relay 43, which comprises a source of electrical energy 44, conductor 45, contact finger 41, conductor 40, contact finger 42, conductor 46, stationary contact 47 of the contacts, group-designated 15' in Fig. 5; rotary contact member 15, contact 48 of the contacts, group-designated 15' in Fig. 5; conductor 49, terminal 50 of manually controlled selector switch C, arm 53 and contact 55 of the selector switch, conductor 62, relay terminals 63 and 64 of relay 43 and conductor 65 to source of electrical energy 44.

The preceding circuit, when completed, energizes relay 43 to attract an armature 66, pivotally mounted between relay 43 and an opposing relay 67. The lower end of armature 66 carries a contact 68 adapted to coact with stationary contact 69. Contacts 68 and 69 are included in the circuit of relay 38, which circuit comprises a source of electrical energy 70, conductor 71, armature contact 68, stationary contact 69, conductor 72, terminals 73 and 74 of relay 38, conductors 75 and 76 to source of energy 70.

When this circuit of relay 38 has been completed its armature 36 will be retracted to operate sleeve 34 and cam 35, thus tripping trigger 23 and permitting operating lever 7 to descend from its "cocked" to its "uncocked" position with consequent rotation of the various rotary contact members of the instantaneous switches A. It will thus be seen that when the "cue" on the film reaches the contacts, relays 43 and 38 will be energized, trigger 23 released and the rotary contact members of instantaneous switches A rotated to open the "cue" circuit and start the motor of projector number 2 as will hereinafter appear.

*Fire-shutter controlled electro-mechanical trip mechanism.*—In order to trip trigger 23' when the projector about to go into service attains projection speed, the shaft 32 situated between casings 2 and 2' of the control unit, is provided intermediate its ends with a cam 77 and an armature 78. Cam 77 is arranged on shaft 32 for contact with a friction roller 79, journalled in trigger 23' diagonally opposite the friction roller 37 on trigger 23, as clearly shown in Figs. 1 and 2 of the drawings. The armature 78 on shaft 32 is operatively positioned with respect to a relay 81, the circuit of which includes a source of electrical energy 70, conductor 71, armature 66, between relays 43 and 67, contact 82 on the lower end of armature 66, stationary contact 83, conductor 84, terminals 85 and 86 of relay 81 and conductors 75 and 76 to source of energy 70.

When the relay 67 has been energized to retract armature 66, the contacts 82 and 83 will be brought together to complete the circuit of relay 81 whereupon it will attract armature 78, rotate shaft 32 and operate cam 77 to depress trigger 23' and thus release operating lever 7' to permit its slow return against the action of the dash pot to "uncocked" position.

To energize relays 67 and 81 when the projectors attain projection speed, the automatic fire-shutters D and D' of the projectors are operatively connected through link mechanisms 87 and 88 with arms 89 and 90 of switches F and G, the connection being such that when the fire-shutters are in their open positions, arms 89 and 90 of switches F and G, will be in engagement with contacts 89' and 90'.

The automatic fire-shutters D and D' may be of any of the conventional types wherein when the driving motor of the projector attains projection speed, the shutter automatically opens and when the speed of the motor drops below such speed it automatically closes. As these shutters form no part of the instant invention, except in so far as they serve to open and close switches F and G, it has been deemed sufficient for the purpose of this disclosure to merely diagrammatically show that when the fire-shutters D and D' are in their open position switches F and G will be closed and vice versa.

The fire-shutter controlled switch F of projector 1 is included in a circuit comprising a source of electrical energy 44, conductors 45 and 92, terminal 92' and arm 89 of switch F, contact 89', conductor 93, terminal 60, movable arm 54 and terminal 61 of selector switch C, conductor 94, stationary contact 95 of the contacts, group-designated 18' in Fig. 5, rotary contact member 18, stationary contact 96 of contacts, group designated 18' in Fig. 5, conductor 97, terminals 98 and 99 of relay 67, and conductors 100 and 65, to the source of electrical energy 44.

Fire-shutter controlled switch G of projector 2 is included in an energizing circuit comprising a source of electrical energy 44, conductor 45, terminal 101, arm 90 and contact 90' of switch G, conductor 102, contact 58, arm 54 and terminal 61 of selector switch C, conductor 94, contact 95, rotary contact member 18, contact 96, conductor 97, terminals 98 and 99 of relay 67, conductors 100 and 65 to the source of electrical energy 44.

In the light of the foregoing circuits it will be manifest, when the automatic fire shutters D and D' have been opened so as to close switches F and G, relay 67 will be energized to retract armature 66 and thus close the circuit of relay 81, whereupon the armature 78 of relay 81 will be retracted, shaft 32 revolved, cam 77 operated and trigger mechanism 23' tripped, releasing operating lever 7', so that the latter under the action of its spring, but against the action of the dash-pot, will slowly move from its "cocked" to its "uncocked" position and in doing so rotate the various rotary contact members of "delayed action" switches B.

In the event it is desirable to trip the triggers 23 and 23' independent of automatic "cue" and "fire-shutter action", auxiliary circuits are provided for relays 43 and 67, so as to bring armature contacts 68 or 82 into engagement with contacts 82 or 83 to close the circuits of relays 38 or 81 for the purpose previously described, and these circuits are controlled by auxiliary switch H and selector switch C.

One of the auxiliary circuits adapted to energize relay 43 comprises a source of energy 44, conductor 45, conductor 103, terminal 104, movable arm 105 and terminal 106 of switch H, conductor 46, stationary contact 47, rotary contact member 15, contact 48, conductor 49, terminal 50, movable arm 53 of selector switch C, contact 55, conductor 62, terminals 63 and 64 of relay 43, and conductor 65 to source of electrical energy 44.

The other auxiliary circuit which is provided for relay 67, comprises (assuming movable arms 53 and 54 of selector switch C to be in engagement with contacts 56 and 59) source of energy 44, conductors 45 and 103, terminal 104, movable arm 105, and terminal 106 of switch H, conductor 46, stationary contact 47, rotary contact member 15, stationary contact 48, conductor 49, terminal 50, arm 53 and contact 56 of selector switch C, conductor 107, interconnecting contacts 56 and 59, arm 54 and terminal 61 of selector switch C, conductor 94, stationary contact 95, rotary contact member 18, stationary contact 96, conductor 97, terminals 98 and 99 of relay 67 and conductors 100 and 65 to the source of energy 44.

Manifestly, by means of these circuits, triggers 23 and 23', may be tripped to release the operating levers 7 and 7', at the will of the operator without waiting for the action of the automatic "cue" or that of the automatic fire-shutter, as will be readily understood without further discussion.

The manually operated selector switch C, is adapted to determine the electrical paths defined for a change-over from projector number 1 to projector number 2, and vice versa. For this purpose the selector switch C is provided with an indicator 51 keyed to shaft 52 to which are also keyed switch arms 53 and 54, so that the pointer and the switch arms operate as a unit. Indicator 51 coacts with the indications 2—0—1, the numerals 2—1 identify the projectors, the cipher referring to the auxiliary control circuit to be used in conjunction with switch H, as hereinbefore described. The movable contact arms 53 and 54 of switch C are adapted to travel over upper and lower rows of contacts 55, 56 and 57; and 58, 59 and 60, and in this connection it is to be noted that contact 57 is connected with contact 55 by conductor 108, so that when the arm 53 is on contact 57, the current will flow through the arm to conductor 62 via conductor 108, as clearly shown in Fig. 7 of the drawings.

When selector switch C has been set as illustrated in Fig. 7, with the movable contact arms 53 and 54 on contacts 55 and 58 and the operating levers 7 and 7' of the control-unit have been brought to "cocked" positions, the change-over will be from projector number 1 to projector number 2. It will thus be seen that selector switch C in conjunction with switch H, controls the auxiliary circuits to relays 43 and 67 as previously described and also determines the projector to go into operation as the film of the finishing machine approaches the end of its run.

The automatic operation of "delayed action" switches B is dependent upon the action of "instantaneous" switches A, that is to say, the "delayed action" switches B and their operating lever 7', cannot be automatically actuated, until the "instantaneous" switches have been first released. This condition is established by including one of the four-way switches of the instantaneous group A, in the motor circuit of the projector about to go into operation (projector number 2). Motor circuit for projector number 2 comprises a source of electrical energy 44, conductors 45 and 110, terminals 111 and 112 of driving motor 113, conductor 114 and stationary contact 115 of the contacts group-designated 16' in Fig. 5, rotary contact member 16, stationary contact 116 of the contacts group-designated 16' in Fig. 5, conductors 117 and 65 to source of electrical energy 44. By virtue of this circuit, when rotary contact 16 of the "instantaneous" switches has been rotated so as to bridge contacts 115 and 116, motor 113 will be started and when said motor has attained projection speed the automatic fire-shutter, closing switch G, trips trigger 23' and releases "delayed action" switches B, as hereinabove described.

The "delayed-action" switches are adapted to be included in the motor of the finishing machine (projector number 1), its arc circuit, the circuit of the sound reproducing means and its automatic douser circuit, likewise these switches are adapted to be included in the arc circuit of the projector going into service, (projector number 2), its sound apparatus and the circuit of the automatic douser, so that as the switches are rotated during the movement of lever 7' from "cocked" to "uncocked" position, its arc quenched and that of the projector going into service "struck" the sound reproducing means shifted from the finishing machine to the projector going into service, the automatic douser of the finishing machine closed, and that of the projector going into service opened. The circuits controlled by the "instantaneous" and "delayed action" switches, with exception of "cue" relay and motor circuits, have not been shown or described as they are not deemed necessary to a complete understanding of the instant disclosure.

To illustrate the manner in which the "delayed action" switches are adapted to control the motor circuit of the finishing machine, its arc and the other circuits mentioned in connection with the finishing machine and that going into service, one of the four-way switches of "delayed action" group B, is shown in circuit with the motor of the finishing projector number 1. This circuit comprises a source of energy 44, conductor 45, conductor 118, terminals 119 and 120 of motor 121, for projector number 1, conductor 122, stationary contact 123, of the contacts group-designated 22' in Fig. 5, rotary contact member 22, stationary contact 123 of the stationary contacts group-designated 22' in Fig. 5, conductors 124, and 65 to the source of electrical energy 44. In like manner the remaining switches of the "delayed action" group may be included in the arc, douser and sound reproducing circuits of projector number 1, and in the corresponding circuits of projector number 2, so that in the change-over from one projector to another, after control lever 7' of the "delayed action" switches has been actuated from "cocked" to "uncocked" position, the motor, arc, douser and sound reproducing circuits of the finishing machine will be opened and the corresponding circuits of the machine going into operation closed, as will be readily understood without further discussion.

In the foregoing discussion the descriptive matter has been confined to the control unit on the finishing projector (projector number 1), by which a change-over from projector number 1 to projector number 2 may be automatically or manually effected, it is to be understood however, that in order to come back, that is to effect a change-over from projector number 2 to projector number 1, all of the circuits hereinabove described must be duplicated and arranged in the same manner as has been described in connection with the control-unit on projector number 1.

Having described the structural and electrical details of the invention under consideration, its operation is as follows:

Assuming the operating levers 7 and 7' of the control-unit on projector number 1, to be in their operative or "cocked" positions and the indicator of selector switch C set for a change-over to projector number 2; then as the "cue" on the film of projector 1, bridges the contact fingers, the circuits of relays 43 and 38 will be closed to trip trigger 23 and release the rotary contact members of "instantaneous" switches A, whereupon the "cue" circuit will be opened and the motor circuit of projector 2 closed.

As the driving motor of projector 2 attains its projection speed and the automatic fire-shutter D' opens, to close switch G, relays 67 and 81 will be energized to trip trigger 23' and release the rotary contacts of the "delayed action" switches B. As the operating lever 7' descends to "uncocked" position, the rotary contact members controlled by said lever, will be actuated to open the circuit of the driving motor of projector 2, and to perform the other functions allotted to the "delayed action" switches.

In conclusion it will be seen this invention provides an automatic control-unit, which may be employed in any assembly wherein a plurality of circuits are to be electro-mechanically controlled in groups, and in the projection art affords an automatic mechanism whereby when a "cue" suitably disposed on the film of the finishing projector engages appropriately arranged contact members, the projector going into service will be started and after attaining projection speed will bring about the circuit changes necessary to a change-over from one projector to another.

Having described my invention, what I claim as new and wish to secure by Letters Patent is:

1. An automatic control-unit for projector installations, wherein there are two projectors, one a finishing, the other the projector going into service, each projector including a traveling film and an automatic fire-shutter adapted to move into open position when the projector going into service attains projection speed, said control-unit comprising a pair of multi-contact switches of the rotary type, said switches being manually operable to a cocked position and self-operating to an uncocked position, trigger mechanisms engaging the respective switches when they are in cocked positions, electro-mechanical means coacting with the trigger mechanisms to successively release the multi-contact switches with a predetermined time interval between releasements, said means including a pair of trip devices associated with the trigger mechanisms, one of said trip devices being electromagnetically operated at a predetermined point in the length of the film of the finishing machine, the other trip device being fire-shutter actuated when the projector going into service has attained projection speed, and means in connection with one of said multi-contact switches to retard its movement to an uncocked position for a time interval predicated on the passage of a selected length of film before the light aperture of the finishing projector.

2. An automatic control-unit for projector installations, wherein there are two projectors, one a finishing, the other the projector going into service, each projector including a traveling film and an automatic fire-shutter adapted to move into open position when the projector going into service attains projection speed, said control-unit comprising a pair of multi-contact switches of the rotary type, said switches being manually operable to a cocked position and self-operating to an uncocked position, trigger mechanisms engaging the respective switches when they are in cocked positions, electro-mechanical means coacting with the trigger mechanisms to successively release the multi-contact switches with a predetermined time interval between releasements, said means including a pair of trip devices associated with the trigger mechanisms, one of said trip devices being electro-magnetically operated at a predetermined point in the length of the film of the finishing machine, the other trip device being fire-shutter actuated when the projector going into service has attained projection speed and means in connection with one of said switches to retard its movement to uncocked position for a time interval predicated on the passage of a selected length of film before the light aperture of the finishing projector.

3. An automatic control-unit for projector installations, wherein there are two projectors, one a finishing, the other the projector going into service, each projector including a traveling film and an automatic fire-shutter adapted to move into its open position when the projector going into service attains projection speed, said control-unit comprising a pair of parallelly arranged adjacently disposed multi-contact switches of the rotary type, said switches being manually operable to a cocked position and self-operating to an uncocked position, trigger mechanisms disposed between and engaging said switches to effect their retention in cocked position, electro-mechanical means coacting with the trigger mechanisms to successively release the respective multi-contact switches with a predetermined time interval between releasements, said means including a pair of trip devices associated with the trigger mechanisms, one of said trip devices being operable at a predetermined point in the length of the traveling film of the finishing machine, the other trip device being fire-shutter actuated when the projector going into service has attained projection speed and means in connection with one of said switches to retard its movement to uncocked position for a period corresponding to the time interval required for the passage of a selected length of film before the light aperture of the finishing projector.

4. An automatic control-unit for projector installations, wherein there are two projectors, one a finishing, the other the projector going into service, each projector including a traveling film and an automatic fire-shutter adapted to move into its open position when the projector going into service attains projection speed, said control-unit comprising a pair of parallelly arranged adjacently disposed multi-contact switches of the rotary type, said switches being manually operable to a cocked position and self-operating to an uncocked position, trigger mechanisms disposed between and engaging said switches to effect their retention in cocked position, electro-mechanical means coacting with the trigger mechanisms to successively release the respective multi-contact switches with a predetermined time interval between releasements, said means including a pair of trip devices associated with the trigger mechanisms, one of said trip devices being operable at a predetermined point in the length of the traveling film of the finishing machine, the other trip device being fire-shutter actuated when the projector going into service attains projection speed and means in connection with one of said switches to retard its movement to uncocked position for a time interval predicated on the passage of a selected length of film before the light aperture of the finishing projector.

5. An automatic control-unit for projector installations, wherein there are two projectors, one a finishing, the other the projector going into service, each projector including a traveling film and an automatic fire-shutter adapted to move into open position when the projector going into service attains projection speed, said control-unit comprising a pair of multi-contact switches of the rotary type, one switch being quick-acting the other slow-acting, said switches being manually operable to a cocked position and self-operating to an uncocked position, trigger mechanisms engaging the respective switches when they are in their cocked positions, electro-mechanical means coacting with the trigger mechanism to successively release the multi-contact switches with a predetermined time interval between releasements, said means including a pair of trip devices associated with the trigger mechanisms, one of said trip devices being operated at a predetermined point in the length of the traveling film of the finishing machine, the other trip device being fire-shutter actuated when the projector going into service has attained projection speed and means in connection with the slow acting switch to retard its movement to uncocked position for a time interval predicated on the passage of a selected length of film before the light aperture of the finishing projector.

6. An automatic control-unit for projector installations, wherein there are two projectors, one a finishing, the other the projector going into service, each projector including a traveling film and an automatic fire-shutter adapted to move into open position when the projector going into service attains projection speed, said control-unit comprising a pair of multi-contact switches of the rotary type, one switch being quick-acting the other slow-acting, said switches being manually operable to a cocked position and self-operating to an uncocked position, trigger mechanisms engaging the respective switches when they are in their cocked positions, electro-mechanical means coacting with the trigger mechanism to successively release the multi-contact switches with a predetermined time interval between releasements, said means including a pair of trip devices associated with the trigger mechanisms, one of said trip devices being operated at a predetermined point in the length of the traveling film of the finishing machine, the other trip device being actuated when the projector going into service has attained projection speed and means in connection with the slow acting switch to retard its movement to an uncocked position for a time interval predicated on the passage of a selected length of film before the light aperture of the finishing projector.

7. An automatic control unit for projector installations, wherein there are two projectors, one a finishing, the other the projector going into service, each projector including a traveling film and an automatic fire-shutter adapted to move into open position when the projector going into service attains projection speed, said control-unit comprising two groups of rotary contacts, the rotary contacts of each group coacting with and traversing complemental stationary contacts, means for manually operating the rotary contacts of each group to a cocked position, means for automatically actuating said rotary contacts to an uncocked position, trigger mechanisms retaining the respective rotary contacts in cocked position, electro-mechanical means coacting with the trigger mechanisms to successively release the two groups of rotary contacts with a predetermined time interval between releasement, said means including a pair of trip devices associated with the trigger mechanisms, one of said trip devices being electro-magnetically operated at a predetermined point in the length of the film of the finishing machine, the other being fire-shutter actuated when the projector going into service has attained projection speed and means in connection with one group of said rotary contacts to retard their movement to uncocked position for a time interval predicated on the passage of a selected length of film before the light aperture of the finishing projector.

8. An automatic control-unit for projector installations, wherein there are two projectors, one a finishing, the other the projector going into service, each projector including a traveling film and an automatic fire-shutter adapted to move into open position when the projector going into service attains projection speed, said control-unit comprising two groups of rotary contacts, means for manually operating the rotary contacts of each group to a cocked position, means for automatically actuating the rotary contacts to an uncocked position, the controls of each group coacting with the complemental stationary contacts which they are adapted to traverse in their movement to and from cocked position, a single control lever for the rotary contacts of each group, said lever serving to move the rotary contacts to cocked and uncocked positions, trigger mechanisms engaging the respective levers when they are in cocked position, electro-mechanical means coacting with the trigger mechanisms to successively release the respective levers with a predetermined time interval between releasements, said means including a pair of trip devices associated with the trigger mechanisms, one of said trip devices being electro-magnetically operated at a predetermined point in the length of the film of the finishing machine, the other trip device being fire-shutter actuated when the projector going into service has attained projection speed and means in connection with one of said groups of rotary contacts to retard their movement to uncocked position for a time interval predicated on the passage of a selected length of film before the light aperture of the finishing projector.

9. An automatic control-unit for projector installations, wherein there are two projectors, one a finishing, the other the projector going into service, each projector including a traveling film, an automatic fire-shutter adapted to move into open position when the projector going into service attains projection speed, a driving motor and a circuit for the motor, said control-unit comprising two groups of rotary contacts, one group being slow, the other quick-acting, stationary contacts coacting with the rotary contacts in each group, certain of the stationary contacts in the quick-acting group being included in the motor circuit of the projector going into service, means for manually operating the rotary contacts of each group, to a cocked position, means for automatically actuating said rotary contacts to an uncocked position, the rotary contacts in the quick-acting group when in uncocked position being adapted to close the motor circuit of the projector going into service, trigger mechanisms retaining the respective rotary contacts in cocked position, electro-mechanical means coacting with the trigger mechanisms to successively release the two groups of rotary contacts with a predetermined time interval between releasements, said means including a pair of trip devices associated with the trigger mechanism, one of said devices being electro-magnetically operated at a predetermined point in the length of the film of the finishing machine, the other being fire-shutter actuated when the projector going into service has attained projection speed and means in connection with said quick acting group of rotary contacts to retard the movement of said contacts to uncocked position for a time interval predicated on the position of the selected length of film before the light aperture of the finishing projector.

10. An automatic control-unit for projector installations, wherein there are two projectors, one a finishing, the other the projector going into service, each projector including a traveling film, an automatic fire-shutter adapted to move into open position when the projector going into service attains projection speed, a driving motor and a circuit for the motor, said control-unit comprising two groups of rotary contacts, one group being slow, the other quick-acting, stationary contacts coacting with the rotary contacts in each group, certain of the stationary contacts in the quick-acting group being included in the motor circuit of the projector going into service, means for manually operating the rotary contacts of each group to a cocked position, means for automatically actuating said rotary contacts to an uncocked position, the rotary contacts in the quick-acting group when in uncocked position being adapted to close the motor circuit of the projector going into service, trigger mechanisms retaining the respective rotary contacts in cocked position, electro-mechanical means coacting with the trigger mechanisms to successively release the two groups of rotary contacts with a predetermined time interval between releasements, said means including a pair of trip devices associated with the trigger mechanism, one of said devices being electro-magnetically operated at a predetermined point in the length of the film of the finishing machine, the other being fire-shutter actuated when the projector going into service has attained projection speed and means in connection with the rotary contacts of the slow acting group to retard the movement of said contact to uncocked position for a time interval predicated on the passage of a selected length of film before the light aperture of the finishing projector.

11. An automatic control-unit for projector installations, wherein there are two projectors, one a finishing, the other the projector going into service, each projector including a traveling film, an automatic fire-shutter adapted to be moved into open position when the projector going into service attains projection speed, a driving motor and a circuit for the motor, said control unit comprising two groups of switches, each switch in the respective group including a rotary and a series of stationary contacts, the rotary contacts of each group of switches having cocked and uncocked positions, means in connection with each group of switches to automatically operate the rotary contacts to uncocked position, means for closing the motor circuit of the projector going into service when one of the rotary contacts of one group of switches moves to uncocked position, whereby the projector going into service will be started and brought to projection speed, trigger mechanisms retaining the rotary contacts in the respective groups in cocked position, electro-mechanical means coacting with the trigger mechanisms to successively release the two groups of rotary contacts with a predetermined time interval between releasements, said means including a pair of trip devices associated with the trigger mechanism, one of said devices being electro-magnetically operated at a predetermined point in the length of the film of the finishing machine, the other being fire-shutter actuated when the projector going into service has attained projection speed and additional means in connection with the rotary contact of one of said groups to retard the movement of said contacts to their uncocked position for a time interval predicated on the passage of a selected length of film before the light aperture of the finishing projector.

12. An automatic control unit for projector installations, wherein there are two projectors, one a finishing, the other a projector going into service, each projector including an automatic fire-shutter adapted to be moved into open position when the projector going into service attains projection speed, and a traveling film, the film being formed near its finishing end with a pair of contacts constituting a cue, said control unit comprising a pair of multi-contact switches of the rotary type, said switches being manually operable to a cocked position and self-operating to an uncocked position, trigger mechanisms engaging the respective switches when they are in cocked position, a cue controlled electro-mechanical trip device coacting with one of the triggers to effect its release, said device including a cam engaging one of the trigger mechanisms, a sleeve carrying said cam, an armature affixed to the sleeve, a magnet coacting with the armature, an energizing circuit for the magnet, said circuit being controlled by the cue on the traveling film, and an automatic fire-shutter-controlled trip device coacting with the remaining trigger mechanism, said device including a cam engaging said trigger mechanism, a shaft within said sleeve, an armature carried by the shaft, a magnet coacting with said armature, an energizing circuit for the magnet, said circuit including a switch and coacting means between the switch and the automatic fire-shutter on the projector going into service, whereby when said projector attains projection speed, the shutter will be opened to close said switch.

13. An automatic control-unit for projector installations, wherein there are two projectors, one a finishing, the other the projector going into service, each projector including an automatic fire-shutter adapted to be moved into open position when the projector going into service attains projection speed, and a traveling film, the film being formed near its finishing end with a pair of contacts constituting a cue, said control-unit comprising a pair of multi-contact switches of the rotary type, said switches being manually operable to a cocked position and self-operating to an uncocked position, trigger mechanisms engaging the respective switches when they are in cocked position and self-operating to an uncocked position, trigger mechanisms engaging the respective switches when they are in cocked position, said device including a sleeve disposed between the multi-contact switches, a cam carried by the sleeve and coacting with one of the trigger mechanisms, an armature attached to the sleeve, a magnet cooperating with the armature, an energizing circuit for the magnet, and an electromagnetic means controlling said circuit, said means including the contacts on the traveling film and an automatic fire-shutter control trip device to effect releasement of the remaining mechanism, said device including a shaft disposed within said sleeve, a cam carried by the shaft and coacting with the trigger mechanism, an armature affixed to the shaft, a magnet cooperating with the armature, an energizing circuit for the armature, an electro-mechanically controlled means adapted to close said circuit, said means including a switch on the projector going into service and a control mechanism between the automatic fire-shutter and said switch, whereby when said shutter opens, said switch will be closed and additional means in connection with one of said multi-contact switches to retard its movement to uncocked position for a time interval predicated on the passage of a selected length of film before the light aperture of the finishing projector.

CHARLES D. FATOR.